United States Patent [19]

Yoshida

[11] Patent Number: 5,346,728

[45] Date of Patent: Sep. 13, 1994

[54] METHOD FOR REFORMING SURFACE

[75] Inventor: Yasuhiko Yoshida, 484-16, Naema, Ooaza, Ooimachi, Irumagun, Saitama, Japan

[73] Assignees: C. Itoh Fine Chemical Co., Ltd., Chiyoda; Yoichi Murayama, Tokyo; Yasuhiko Yoshida, Saitama, all of Japan

[21] Appl. No.: 40,976

[22] Filed: Mar. 31, 1993

[30] Foreign Application Priority Data

Jan. 29, 1993 [JP] Japan ................................. 5-014212

[51] Int. Cl.$^5$ .............................................. B05D 3/06

[52] U.S. Cl. .................................................. 427/569
[58] Field of Search ........................ 427/569, 536, 444

Primary Examiner—Bernard Pianalto
Attorney, Agent, or Firm—Wenderoth, Lind & Ponack

[57] ABSTRACT

The present invention has an object to ensure advanced use of plasma and obtain a plasma-treated reformed surface.

In order to realize the objects above-mentioned, the present invention comprises the step of treating the surface of a macromolecular material with iodine plasma.

1 Claim, 1 Drawing Sheet

METHOD FOR REFORMING SURFACE

FIELD OF THE INVENTION

The present invention relates to a method for reforming the surface of an organic macromolecular material. More particularly, the present invention relates to a method for reforming the surface, which permits control of surface hydrophobicity/hydropilicity and improvement of surface properties of an organic macromolecular material.

PRIOR ARTS AND PROBLEMS

Chemically very active properties of glow-discharged low-temperature plasma in which excited atoms and molecules and radicals are present have attracted the general attention and have widely been applied in various areas including electronics. Such a plasma is applied, for example, for forming a thin film such as an SiC thin film, a diamond thin film, or an organic thin film, and for etching a substrate surface. For the thin film made available by this applied plasma technology, further expansion of uses is expected as a surface coating film, a gas-permeable film and a film having semiconductor properties.

However, detailed study on physical behavior and chemical properties of plasma is still underway, and in order to allow creation of various functional surfaces, further studies are required. Among others, there is a strong demand for searching for plasma activating agents and actively reacting components.

SUMMARY OF THE INVENTION

The present invention was developed in view of the above-mentioned circumstances and has an object to provide a method which ensures sophisticated use of plasma and permits reforming of the surface of a new organic macromolecular material through plasma treatment.

The present invention provides a method for reforming the surface, which comprises the step of treating the surface of an organic macromolecular material with iodine plasma with a view to solving the above-mentioned problems.

BRIEF DESCRIPTION OF THE DRAWING

The FIGURE is a configuration view illustrating a plasma device applicable for the method for surface reforming of the present invention.

Symbols in the drawing indicate as followings;
1: Reaction vessel
2 and 3: Opposed electrodes
4: Variable resistor
5: Gas-tube sign transformer
6: Commercial power source
7: Vacuum evacuation system
8 and 9: Gas supply systems
10: Macromolecular material substrate.

DETAILED DESCRIPTION OF THE INVENTION

Figure 1:
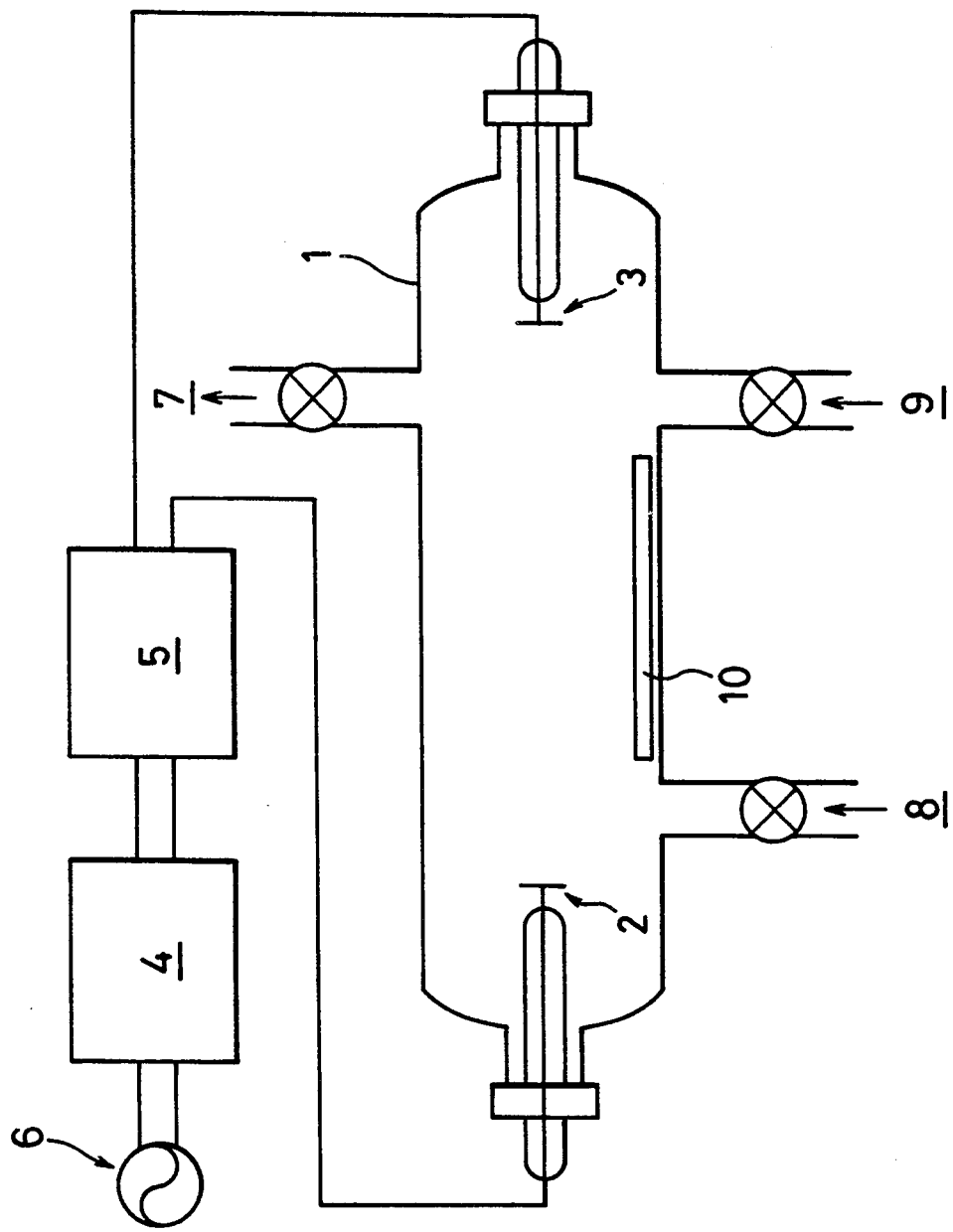

In the method for reforming the surface based on iodine plasma of the present invention, iodine activated by glow discharge plasma of iodine is added to the surface of an organic macromolecular material, and this addition reaction makes it possible to achieve various reformations.

In addition to the reaction which converts evaporated iodine molecules into plasma and activates same, reforming through addition of iodine, surface ornamentation caused by substitution of added iodine and other functions can be accomplished by using various organic compounds (monomer or polymer) combined with iodine atoms, for organic various macromolecular materials (polyolefin, polyester, polyacrylate, polyurethane, polyether, etc.).

Typically, addition of iodine makes it possible to control hydrophobicity/hydrophilicity. When adding iodine onto the surface of a polyolefin material such as polyethylene, it is possible to reform the hydrophobic surface into hydrophilic one.

The surface of an organic macromolecular material may be previously treated with various substances prior to application of the plasma treatment or the present invention.

For the treatment with iodine plasma, a plasma device as shown in the FIGURE may be employed, for example.

In this plasma device, a pair of opposed electrodes (2) and (3) are arranged to the right and left in a reaction vessel (1). These electrodes (2) and (3) are connected to a commercial power source (6) or a power source having an alternating electric filed through a variable resistor (4) and a gas-tube sign transformer (5). For the commercial power source (6), 50 Hz and 100 V may be employed, for example.

The reaction vessel (1) is provided also with a vacuum evacuation system (7) and gas supply systems (8) and (9). The interior of the reaction vessel (1) can be vacuum-evacuated by the use of the vacuum evacuation system (7). iodine gas to be used for plasma treatment is introduced from the gas supply system (8) into the reaction vessel (1). A rare gas such as helium gas, argon gas or nitrogen gas may be introduced as required from the other gas supply system (9).

A subsirate (10), made of an organic macromolecular material, to be surface-treated with iodine plasma can be inserted onto the bottom of the above-mentioned plasma device in the reaction vessel (1) and arranged between the electrodes (2) arid (3).

When reforming the surface of the organic macromolecular material substrate (10), the interior of the reaction vessel (1) is evacuated by means of the vacuum evacuation system (7) to a prescribed pressure. Then, iodine gas, and as required a rare gas such as argon gas, are introduced from the gas supply systems (8) and (9) into the reaction vessel (1). Voltage is then impressed from the commercial power source (6) and amplified in the gas-tube sign transformer (5) to cause generation of iodine plasma between the opposed electrodes (2) and (3). Treatment of the surface of the macromolecular material substrate (10) with this iodine plasma results in addition of iodine onto the surface thereof, thus largely improving hydrophilicity. The surface of the macromolecular material substrate (10) is thus reformed.

It is needless to mention that a device other than that shown in the FIGURE may be used. Applicable devices include those based on the high-frequency excitation with coil electrodes, the ECR method and the hollow cathode method.

The method for reforming the surface of the present invention will now be described further in detail by means of examples.

EXAMPLE 1

A polyethylene substrate was arranged between opposed electrodes (2) and (3) in the reaction vessel (1) of the plasma device shown in FIG. 1, and surface treatment was carried out for one hour by means of iodine ($I_2$) plasma generated by applying a commercial power source of 50 Hz and 100 V. Voltage impressed onto the opposed electrode (2) and (3) was varied to 3.0 kV, 3.6 kV, 4.2 kV and 4.8 kV, and iodine plasma treatment was conducted at each of these values of impressed voltage. The surface of the polyethylene substrate after treatment was ESCA-analyzed. The results are shown in Table 1.

TABLE 1

| Impressed voltage | O/C | I/C |
| --- | --- | --- |
| 3.0 kV | 0.63 | 0.04 |
| 3.6 kV | 0.57 | 0.06 |
| 4.2 kV | 0.59 | 0.10 |
| 4.8 kV | 0.82 | 0.29 |

An increase in the amount of iodine combined to the polyethylene substrate was confirmed.

For comparison purposes, a polyethylene substrate in a case where only iodine gas was introduced into the reaction vessel without generating plasma was ESCA-analyzed. It was confirmed that iodine was not combined with the surface of the polyethylene substrate without generation of plasma.

For the above-mentioned polyethylene substrate after iodine plasma treatment, hydrophobicity/hydrophilicity of the surface was examined via measurement of the contact angle with water. The results are shown in Table 2.

TABLE 2

| Impressed voltage | Water contact angle |
| --- | --- |
| Not treated | 97° |
| 3.0 kV | 88° |
| 3.6 kV | 68° |
| 4.2 kV | 56° |
| 4.8 kV | 59° |

As is evident from Table 2, the water contact angel largely decreased after the completion of the iodine plasma treatment, thus improving hydrophilicity. It was confirmed that this water contact angle considerably decreased by the combination of even a slight amount of iodine with the surface of the polyethylene substrate.

EXAMPLE 2

Using a device similar to that in the Example 1, the surface of a polyethylene substrate was treated for one hour with iodine ($I_2$) plasma generated at impressed voltages of 3.0 kV and 3.6 kV. Thereafter, only iodine gas was introduced from the gas supply system (8) into the reaction vessel (1) of the plasma device and was brought into contact with the substrate surface for one hour. After the treatment, the surface of the polyethylene substrate was ESCA-analyzed. The results are shown in Table 3.

TABLE 3

| Impressed voltage | O/C | I/C |
| --- | --- | --- |
| 3.0 kV | 1.35 | 0.16 |
| 3.6 kV | 1.28 | 0.43 |

The iodine gas treatment after the iodine plasma treatment caused combination of more iodine with the polyethylene substrate.

For the polyethylene substrate after treatment, hydrophobicity/hydrophilicity was examined through measurement of the contact angle with water in the same manner as in the Example 1. The results are shown in Table 4.

TABLE 4

| Impressed voltage | Water contact angle |
| --- | --- |
| Not treated | 97° |
| 3.0 kV | 84° |
| 3.6 kV | 73° |

As is clear from Table 4, the water contact angle largely decreased after treatment, leading to an improved hydrophilicity. It was also confirmed that the water contact angle was largely reduced by the combination of iodine with the surface of the polyethylene substrate.

EXAMPLE 3

The surface of a polyethylene substrate was treated for one hour with iodine ($I_2$) plasma generated at an impressed voltage of 3.6 kV. Thereafter, treatment was carried out with iodine gas alone for another one hour, and the surface was then treated with 2-aminoethanol.

For the surface after treatment, the contact angle with water was examined relative to the amine treatment time (in minutes). The results ape shown in Table 5.

The results obtained in a case without plasma treatment and iodine gas treatment are shown in Table 6.

TABLE 5

| Amine treatment time (minutes) | Water contact angle |
| --- | --- |
| Not treated | 97° |
| 15 | 35° |
| 30 | 31° |
| 45 | 30° |
| 60 | 29° |

TABLE 6

| Amine treatment time (minutes) | Water contact angle |
| --- | --- |
| Not treated | 97° |
| 15 | 89° |
| 30 | 86° |
| 45 | 76° |
| 60 | 83° |

It is known from Tables 5 and 6 that plasma treatment makes a remarkable contribution to the improvement of hydrophilicity.

It is needless to mention that the present invention is not limited to the examples presented above. Various manners are of course applicable as to the plasma device and details of reaction conditions.

According to the present invention, as described above in detail, a novel reformed surface of an organic macromolecular material is available.

What is claimed is:

1. A method for reforming a surface of an organic macromolecular material, which comprises the step of treating the surface of an organic macromolecular material with iodine plasma.

* * * * *